United States Patent [19]

Muscat

[11] Patent Number: 4,830,425
[45] Date of Patent: May 16, 1989

[54] LATCHING SYSTEM FOR A CONVERTIBLE TOP

[76] Inventor: Peter P. Muscat, 14980 Waterfall Rd., Northville, Mich. 48167

[21] Appl. No.: 140,487

[22] Filed: Jan. 4, 1988

[51] Int. Cl.$^4$ ............................................. B60J 7/08
[52] U.S. Cl. .............................. 296/107; 296/120.1; 292/34; 292/DIG. 5
[58] Field of Search ............... 296/120 A, 120 R, 121, 296/107; 292/DIG. 5, 34, 36, 170, 37, DIG. 40, 302

[56] References Cited

U.S. PATENT DOCUMENTS

| | | | |
|---|---|---|---|
| 1,094,962 | 4/1914 | Arens et al. | 292/37 X |
| 2,570,260 | 10/1951 | Milhan | 296/120 R |
| 2,586,648 | 2/1952 | Hale et al. | 296/120 A |
| 2,831,718 | 4/1958 | Hallek et al. | 292/DIG. 5 X |
| 3,089,719 | 5/1963 | Csizmansky | 296/120 R |
| 3,266,838 | 8/1966 | Heincelman | 296/121 |
| 3,425,742 | 2/1969 | Rauber | 296/121 |
| 4,470,277 | 9/1984 | Uyeda | 292/34 X |

FOREIGN PATENT DOCUMENTS 363241 9/1938 Italy ............................... 292/DIG.5

Primary Examiner—Robert B. Reeves
Assistant Examiner—Brian Sells
Attorney, Agent, or Firm—John R. Benefiel

[57] ABSTRACT

A latching system for securing the header of a convertible top frame to the windshield frame top piece including a pair of laterally spaced latching mechanisms operated by a central rotary handle, each mechanism having a striker bar reciprocated between a locking and release position by a crank actuated pull bar actuating the striker bar. The striker bar is received into a recess formed in a striker block fixed to the windshield frame top piece when the striker blade is moved to the locking position and these elements coact to draw the header down to be securely latched. As the striker bars are advanced, downwardly inclined guide tangs are inserted in an inclined pocket in the striker block. As the top frame is positioned atop the windshield frame, the tangs draw the header forward into proper forward alignment with the windshield frame top piece.

8 Claims, 3 Drawing Sheets

LATCHING SYSTEM FOR A CONVERTIBLE TOP

BACKGROUND OF THE INVENTION

This invention concerns latching systems and mechanisms, and more particularly latching systems for securing the header member of a convertible top frame to the windshield frame top piece in a convertible automobile.

Reference is made to U.S. Pat. Nos. 2,570,260 and 2,831,718 illustrating such latching systems involving a single rotary handle operating a pair of camming mechanisms on either side of the top header.

U.S. Pat. No. 4,664,436 also involves a pair of latching mechanisms operated with a crank mechanism, utilizing a roller-slot drawn operation, but also utilizing prominently projecting pins on the top header to bring the top header into correct alignment with the windshield frame.

Such latching mechanisms should minimize the use of exposed projecting parts for aesthetic and safety purposes, as are used in the aforementioned patents.

Convertible tops often require significant stretching of the fabric to bring the header all the way forward into proper alignment with the locating pins, particularly often the top has been lowered for a lengthy period, causing folds to be set in the fabric.

It is an object of the present invention to provide a latching mechanism for convertible top frames which does not utilize sharply projecting elements on either the top header or the windshield frame and which assists in bringing the header forward into proper alignment with the windshield frame.

It is a further object to provide such a system which is easily operated but offers secure locking of the top header to the windshield frame.

SUMMARY OF THE INVENTION

These and other objects of the present invention which will become apparent upon a reading of the following specification and claims are achieved by a latching system comprised of a pair of spaced latching mechanisms located within either side of a convertible top frame header. Each mechanism is operated by a central rotary lever and includes a reciprocable striker bar cooperating with a striker block fixed to the windshield frame top piece to establish latching between the header and windshield frame top piece.

Each latching mechanism includes a downwardly inclined guide tang which moves into a mating inclined pocket in the top of the striker block to locate the header and striker block and align the striker bar with a rear facing opening in the striker block as the header initially approaches the windshield frame top piece when the convertible top is raised. The striker bars are both advanced into the openings in the respective strike block by lever induced movement of pull bars camming the striker bars forward by a pin and slot connection therebetween.

The leading end of the striker bars is inclined and cooperates with a ramp surface of the mating striker block opening to draw the header down atop the windshield top piece, compressing the weather seal located therebetween. The downwardly inclined guide tang is cammed by engagement with a striker block inclined pocket surface to draw the header forward as the header is drawn downwardly by the striker bar action, so that the latching mechanisms act to bring the header into forward alignment with the windshield frame.

The leading end of each striker bar enters openings in the respective guide tang as the pin-and-slot connection reaches a self locking detent position, to complete the locking action.

The latching system according to the present invention has the advantage of eliminating the use of prominently projecting guide pins, and uses a multiple leveraged latching action to insure easy operation. Simple components allow economical manufacture and reliable operation.

DESCRIPTION OF THE DRAWINGS

FIG. 1a is a plan view of a rotary lever plate and portions of the attached operating rods included in the latching system shown in the overcenter locked condition.

DETAILED DESCRIPTION

In the following detailed description, certain specific terminology will be employed for the sake of clarity and a particular embodiment described as required under 35 USC §112, but it should be understood that this is not intended to be limiting inasmuch as the invention is capable of taking many forms and variations within the scope of the appended claims.

Figure 1:
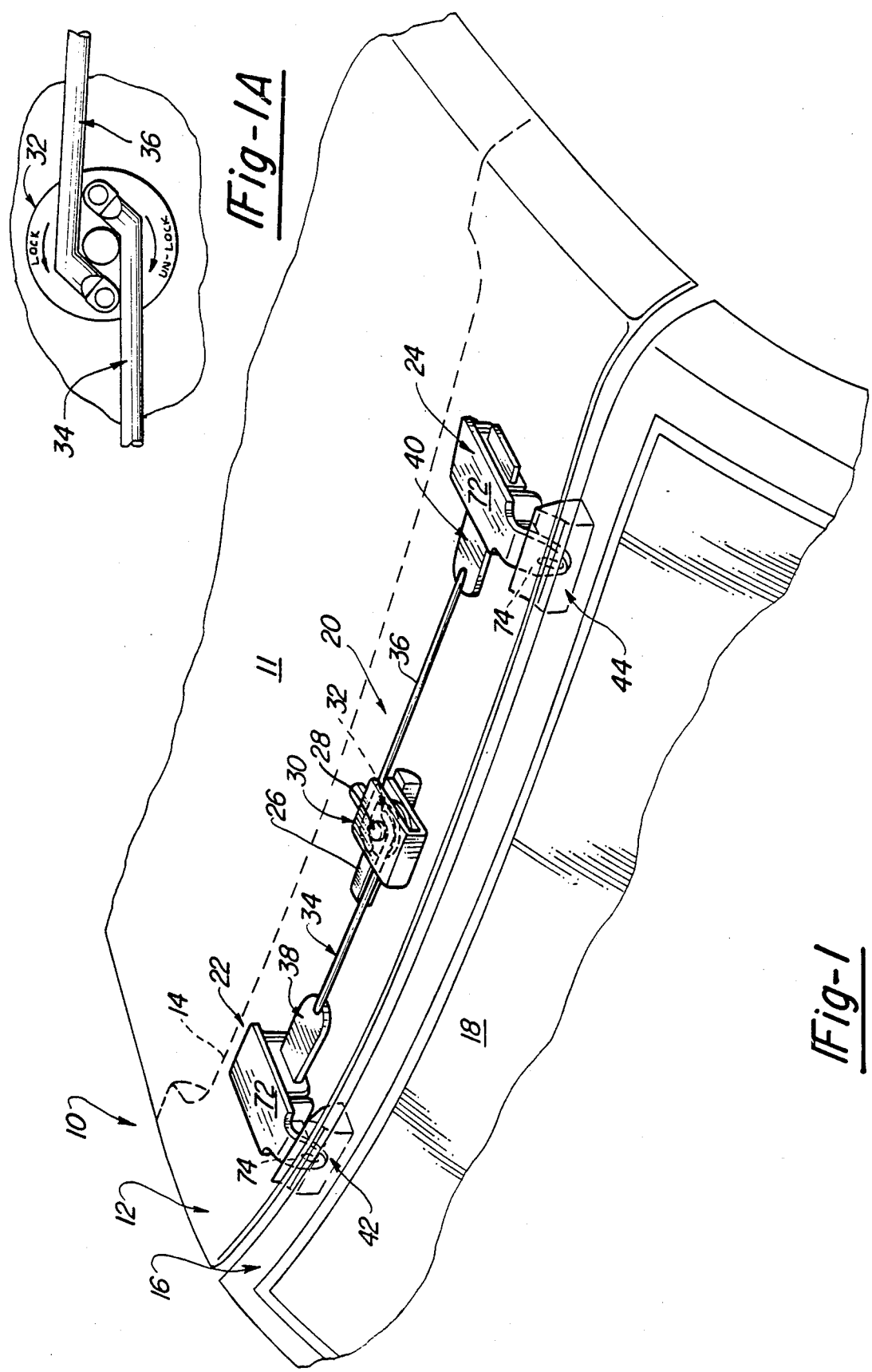
FIG. 1 is a fragmentary perspective view of the top portion of a convertible automobile illustrating the latching system according to the present invention.

Referring to the Drawings and particularly FIG. 1, a portion of the roof of a convertible top automobile 10 is shown, including a foldable top 12 adapted to be raised over the passenger compartment 11 as shown. The top 12 includes a header member 14 comprised of a hollow extrusion included in the top frame.

The header member 14 extends side to side across the top 12 and is configured to be coextensive with a windshield frame top piece 16 extending above the windshield 18.

A latching system 20 according to the present invention is shown adapted to draw a first structure comprised of the header 14 onto a second structure comprised of the windshield frame top piece 16 and securely lock the same together.

The latching system 20 includes a pair of laterally spaced latching mechanisms 22 and 24 mounted within either side of the hollow header member 14 operated by a centrally located operating handle 26 disposed externally of the header member 14 to be accessible from within the passenger compartment 11. Operating handle 26 is affixed to a pivot shaft 28 rotatably mounted in a housing 30 disposed within the header 14, with a rotary lever plate 32 fixed to pivot shaft 28.

A pair of operating rods 34, 36 are each pinned at one end to the periphery of the lever plate 32 so as to be reciprocated by rotation of the operating handle 26 in either direction.

Each latching mechanism 22, 24 includes a respective pull bar 38, 40 pinned to the other end of each operating rod 34, 36 so as to also be reciprocable by rotation of the operating handle 26.

The latching system 20 also includes a pair of striker blocks 42, 44 affixed on the inside face of the windshield frame top piece 16 at laterally spaced locations to be aligned with a respective latching mechanism 22, 24.

FIG. 1a shows that as the lever plate 32 is rotated to the locked position, the ends of the operating rods 34 move overcenter so that reaction forces act to maintain the locked condition.

Figure 2:
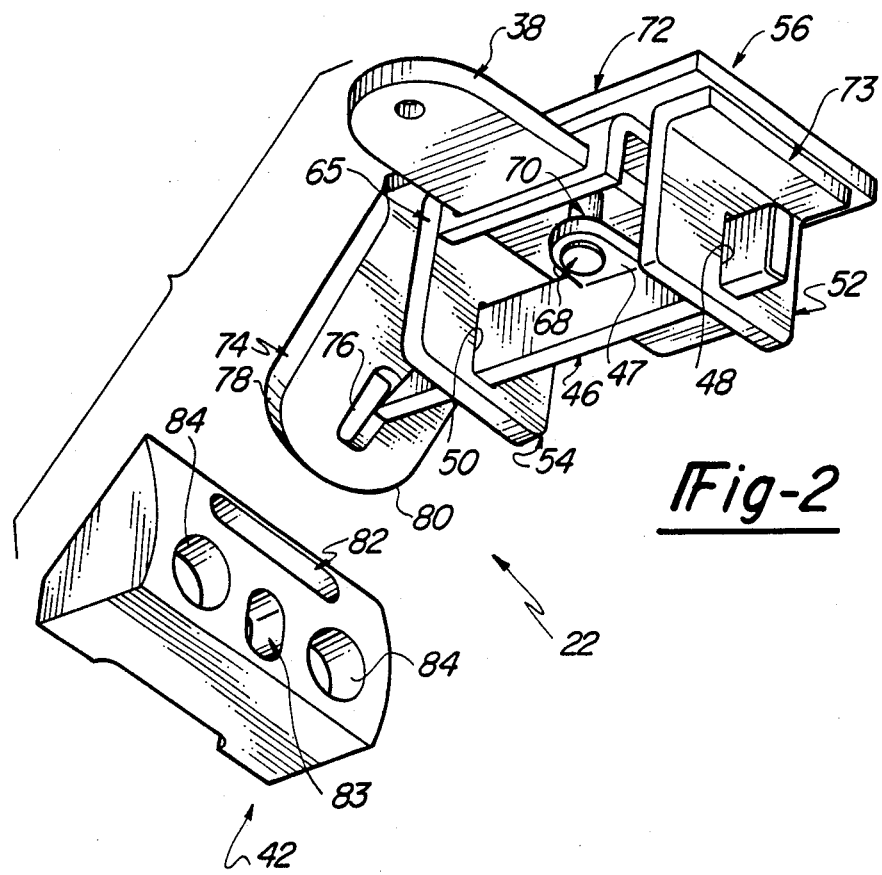
FIG. 2 is a perspective view looking upward at one of the latching mechanisms included in the latching systems shown in FIG. 1 together with an associated striker block.
Figure 3:
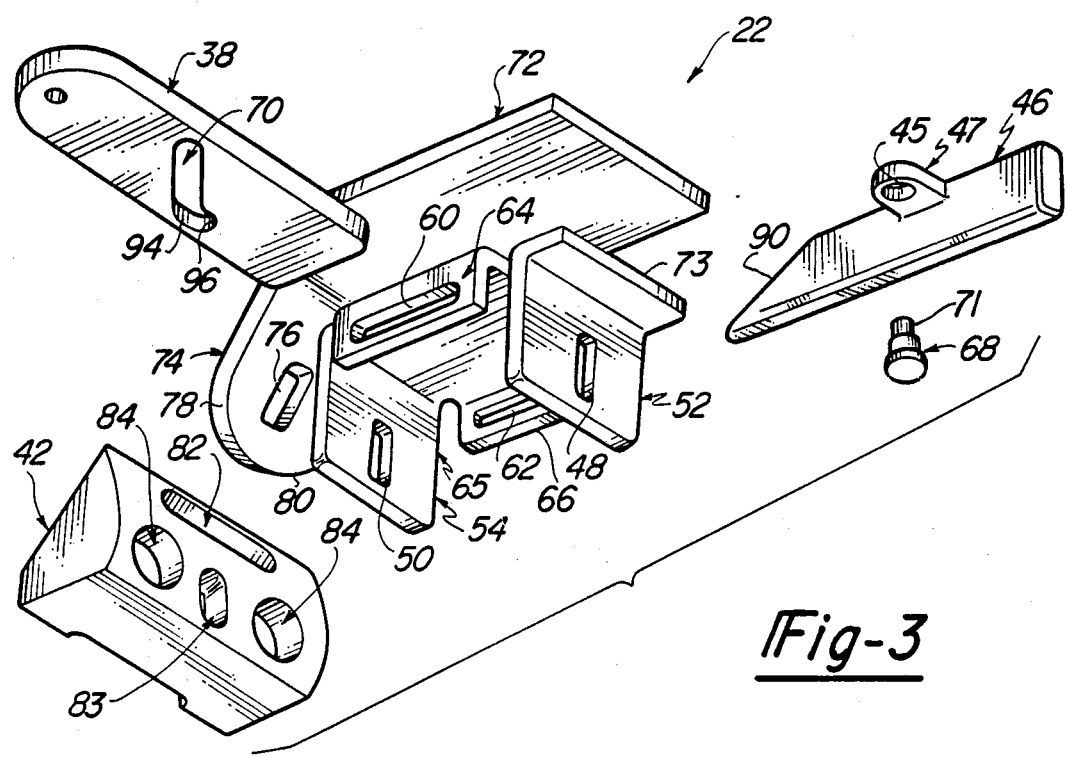
FIG. 3 is an exploded perspective view of the components of the latching mechanism and an associated striker block shown in FIG. 1.

FIGS. 2 and 3 illustrate the components of the right hand latching mechanism 22, in detail, typical of both latching mechanisms 22, 24. These include a striker bar 46 slidably received in slots 48, 50 in spaced angle plate 52, and flange 54 of an angle piece 65, together with guide plate 52 welded together to form a housing. The striker bar 46 is thereby mounted for reciprocation in a direction transverse to the header member 14 and windshield frame top piece 16.

Each pull bar 38, 40 is slidably mounted in a horizontal direction transverse to the direction of movement of the striker bar 46, by means of guide slots 60, 62 formed in spaced pull bar flanges 64, 66 formed in angle piece 65. The pull bar 38 is drivingly engaged to a respective striker bar 46 by means of a pin and slot interconnection in latching mechanism 22 comprised of a pin 68 mounted in a bore 45 formed in a lug 47 attached to the striker bar 46 so as to vertically extend an end 71 of the pin 68 upwardly, to be received in a slot 70 formed in the pull bar 38. The slot 70 is inclined with respect to the direction of movement of both the striker bar 46 and the pull bar 38 such that as the pull bar 38 is moved outwardly by rotation of the lever plate 32 in the locking direction, the striker bar 46 is moved outwardly towards the striker block 42, with reverse movement upon rotation of the lever plate 32 in unlocking direction.

The slot 70 in each pull bar 38, 40 is formed with a terminal straight section 94 parallel to the direction of movement of the pull bar 38, 40, having an indentation 96, into which the pin end 62 of each pin 60 moves in the fully locked position, to create a latching action. The reaction forces generated by compression of the weather seal 88 tending to lift the header 14 are absorbed by the indentation 96 to defeat the tendency to cam the striker bars 46 to be released.

Each latching mechanism 22, 24 also includes a locating tang plate 72 welded to the top 73 of the angle plate 52 and angle piece 65 extending in the direction of movement of the striker bar 46. Locating tang plate 72 has a tang portion 74 projecting forwardly of the housing 56 and inclined downwardly, tang portion 74 formed with a central slot 76 and chamfered corners 78, 80. The central slot 76 is aligned with the striker bar 46 and slots 48, 50.

The tang portion 74 is approximately aligned with a respective downwardly inclined pocket 82 formed into striker blocks 42,44 matching the inclination of the tang portion 74.

The striker blocks 42, 44 are formed with a pair of through bores 84 for receiving threaded fasteners (not shown) affixing the same to the windshield frame top piece 16.

A recess 83 is aligned to receive the forward end of the striker bar 66 as it is advanced to a locking position.

Figure 4:
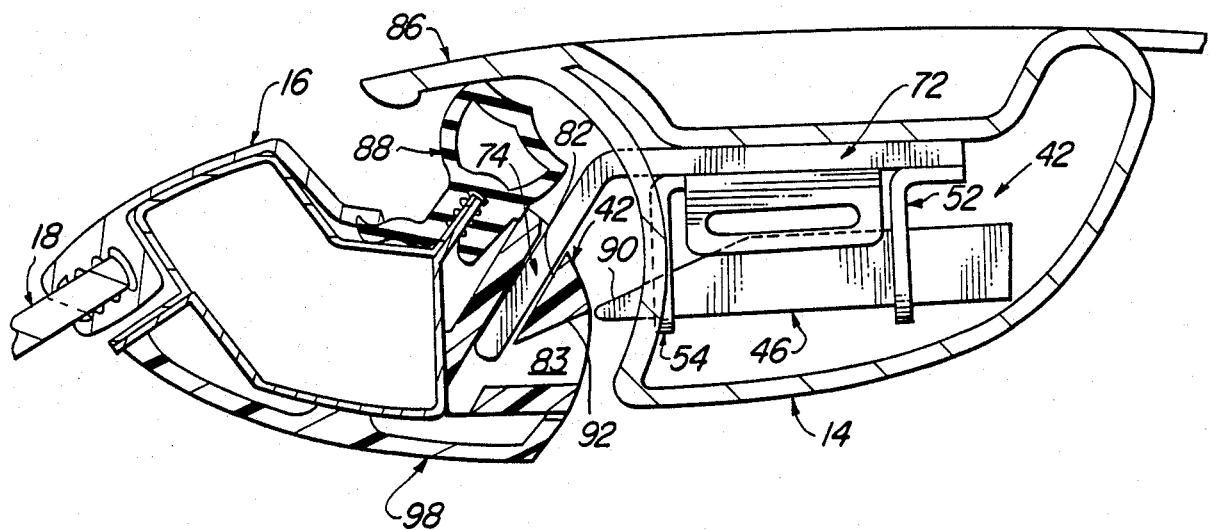
FIG. 4 is a fragmentary sectional view taken through the top and windshield frame with an associated latching mechanism and striker block as the top approaches the windshield frame top piece.
Figure 5:
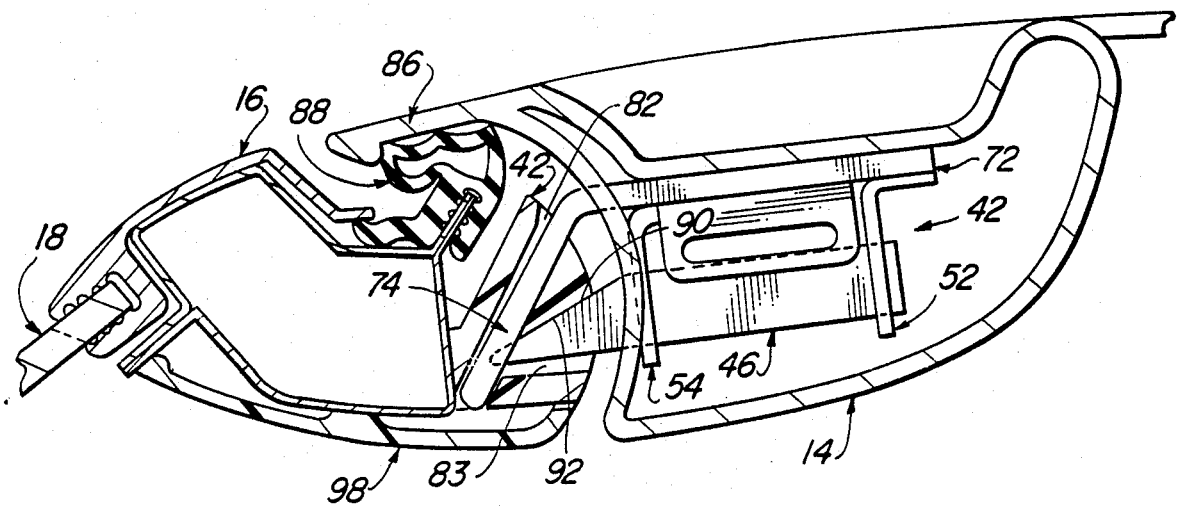
FIG. 5 is a fragmentary sectional view shown in FIG. 4 with the latching mechanism operated to the fully locked condition.

Referring to FIGS. 4 and 5 further details of the striker blocks 42, 44 can be understood.

In FIG. 4, the convertible top 12 has been raised and the header 14 lowered over the windshield frame top piece 16, the tang portions 74 of each latch mechanism 22, 24 entering the pocket 82 of the respective striker blocks 42, 44. This insures accurate alignment of each striker bar 46 with a recess 83 also formed in each striker block 42, 44.

An upper lip 86 of the header 14 is moved to overly a main weather seal 88, which is in a substantially uncompressed state prior to operation of the latching mechanisms 20, 22.

The leading end of each striker bar 46 is formed with a sloping upper surface 90 which mates with a similar sloping upper surface 92 forming in part the recess 83, so that as the striker bars 46 are advanced to the locking position, a ramping or camming action occurs, drawing the header 14 downwardly and compressing the weather seal 88 as shown in FIG. 5.

At the same time, the inclined tang portion 74 acts against the inclined pocket 82 to generate a camming action drawing the header 14 forwardly, as seen in FIGS. 4 and 5, bringing the header 14 into forward alignment with the top piece 16.

As the striker bars 46 advance to the fully locked position, the leading end of the striker bars 46 enter the slots 76 of the tang portion 74 of each locating tang plate 72 to establish an encirclement, augmenting the lock to the striker blocks 42, 44.

This arrangement provides a detent in the fully locked condition.

In order to further complete the detent effect in the locked condition, the rotary lever plate 32 also rotates to an overcenter condition, (FIG. 1a) resisting release by reaction forces acting on the operating rods 34, 36, as described above.

Accordingly, a secure failsafe latching effect is achieved.

A trim piece 98 is affixed to the interior surface of the windshield frame top piece 16, extending beyond the rear wall thereof sufficient to underly the striker blocks 42, 44, presenting a trim interior appearance as shown.

It can thus be appreciated that a mechanism has been provided which eliminates the sharply projecting separate locating pins of the prior art which act not only to draw down the header 14 onto the windshield frame top piece 16, but also draws the same forward, reducing the effort required in raising the top.

Smooth, low effort latching is also assisted by the combined leverage exerted by the rotary latching plate 32, operating rods 34, 36, the pin and slot connection between the striker bars 46 and pull bars 38, 40, and the ramp surfaces 90, 92.

The design is simple add rugged, allowing low cost manufacture and reliable operation.

I claim:

1. A latching system for securing together a movable top cover structure for a convertible automobile, adapted to be selectively positioned atop a fixed structure of said automobile, with a weather seal being compressed therebetween, said latching system comprising:

at least one latching mechanism to one of said structures, said latching mechanism including a striker bar mounted for reciprocating movement;

actuating means for causing said reciprocating movement of said striker bar;

a protruding locating tang also fixed to said one structure;

a striker block affixed to the other of said structures, said striker being formed with a pocket aligned with said protruding tang to receive the same as said top cover structure is positioned atop said fixed structure and laterally locate said striker block with respect to said latching mechanism; said striker block also formed with a recess in alignment with said striker bar when said tang is disposed in said pocket;

the leading edge of said striker bar vertically sloping in the direction of said reciprocation and said stroker block recess formed with a mating sloping surface whereby advance of said striker bar into said recess causes structures to be drawn together to compress said weather seal;

actuating means for causing advance of said striker bar into said recess and retraction therefrom, and, detent mans releasably securing said striker bar in the fully advanced position in said recess whereby said structures are locked together by movement of said striker bar into said recess of said stroker block.

2. The latching system according to claim 1 wherein said actuating means includes a pull bar mounted for reciprocation in a horizontal direction normal to said direction of reciprocation of said striker bar, and further includes cam means interengaging said pull bar and said striker bar causing said advance and retraction of said striker bar upon advance and retraction of said pull bar.

3. The latching system according to claim 2 wherein said cam means includes a pin-and-slot interconnection between said striker bar and said pull bar.

4. The latching system according to claim 3 wherein said pin-and-slot interconnection comprises a horizontal slot in said pull bar inclined to the direction of movement of said pull bar, with a terminal section extending parallel to said direction to provide a detent position.

5. The latching system according to claim 4 further including a second latching mechanism and striker block each configured as said first mentioned latching mechanism and striker block, and spaced apart therefrom, and wherein said actuator means further includes a rotary lever intermediate said latching mechanisms and a pair of operating rods each having one end connected thereto extending in opposite directions and with the other end connected to one end of a pull bar of a respective latching mechanism, and wherein said rotary lever moves overcenter when moving to a position corresponding to the fully advanced position of the striker bar of each of said latching mechanism preventing retraction of said striker bars by reaction forces generated during locking of said structures, thereby comprising at least in part said detent means.

6. The latching systems according to claim 1 wherein said tang has a portion inclined in the direction of said striker bar downwardly from a point above said striker bar and said pocket in said striker block has a mating inclined surface, said tang portion and said pocket acting when said structures are drawn together to move one structure forward relative said other structure.

7. The latching system according to claim 6 wherein said tang is formed with a slot aligned with said striker bar located to receive the forward end of said striker bar as said striker bar moves to the full advanced position.

8. The latching system according to claim 5 wherein said convertible automobile is formed with a hollow header member comprising said one of said structures enclosing each of said latching mechanisms with said tangs protruding, and also enclosing said rotary lever and operating rods; and said automobile is formed with a windshield frame top piece comprising said other of said structures having said striker blocks affixed thereto.

* * * * *

UNITED STATES PATENT AND TRADEMARK OFFICE
CERTIFICATE OF CORRECTION

PATENT NO. : 4,830,425
DATED : May 16, 1989
INVENTOR(S) : Peter P. Muscat

It is certified that error appears in the above-identified patent and that said Letters Patent is hereby corrected as shown below:

Column 4, line 60, "add" should be --and--.

Column 5, line 1, after "mechanism" insert --affixed--.

Column 5, line 19, "stroker" should be --striker--.

Column 5, line 21, after "causes" insert --said--.

Column 5, line 25, "mans" should be --means--.

Column 5, line 26, after "recess" insert --,--.

Column 5, line 28, "stroker" should be --striker--.

Column 6, line 16, "mechanism" should be --mechanisms--.

Column 6, line 20, "systems" should be --system--.

Signed and Sealed this

Twentieth Day of February, 1990

*Attest:*

JEFFREY M. SAMUELS

*Attesting Officer*  *Acting Commissioner of Patents and Trademarks*